No. 661,248. Patented Nov. 6, 1900.
J. KAYLOR.
CONVERTIBLE CORN PLANTER.
(Application filed Nov. 10, 1899.)

(No Model.) 5 Sheets—Sheet 1.

No. 661,248. Patented Nov. 6, 1900.
J. KAYLOR.
CONVERTIBLE CORN PLANTER.
(Application filed Nov. 10, 1899.)

(No Model.) 5 Sheets—Sheet 2.

Witnesses:

Inventor:
John Kaylor
By Bond, Adams, Pickard & Jackson
Attys.

No. 661,248. Patented Nov. 6, 1900.
J. KAYLOR.
CONVERTIBLE CORN PLANTER.
(Application filed Nov. 10, 1899.)

(No Model.) 5 Sheets—Sheet 3.

Inventor
John Kaylor

No. 661,248. Patented Nov. 6, 1900.
J. KAYLOR.
CONVERTIBLE CORN PLANTER.
(Application filed Nov. 10, 1899.)
(No Model.) 5 Sheets—Sheet 4.

No. 661,248. Patented Nov. 6, 1900.
J. KAYLOR.
CONVERTIBLE CORN PLANTER.
(Application filed Nov. 10, 1899.)

(No Model.) 5 Sheets—Sheet 5.

Witnesses
S. R. Richards.
Ira D. Perry

Inventor
John Kaylor
By Bird Adams, Prickard Jackson
Att'ys.

THE NORRIS PETERS CO., PHOTO-LITHO., WASHINGTON, D. C.

UNITED STATES PATENT OFFICE.

JOHN KAYLOR, OF DECATUR, ILLINOIS.

CONVERTIBLE CORN-PLANTER.

SPECIFICATION forming part of Letters Patent No. 661,248, dated November 6, 1900.

Application filed November 10, 1899. Serial No. 736,484. (No model.)

*To all whom it may concern:*

Be it known that I, JOHN KAYLOR, a citizen of the United States, residing at Decatur, in the county of Macon and State of Illinois, have invented certain new and useful Improvements in Convertible Corn-Planters, of which the following is a specification, reference being had to the accompanying drawings.

My invention relates to improvements in corn-planters; and one of its objects is to provide a new and improved convertible planter which can be used for drill-planting, as a cumulative drop-planter in which grains of seed are dropped singly from a seed-cup actuated by the rear wheels to a lower valve or valves, which lower valve or valves are actuated by check-rower apparatus to discharge the grains of seed in accumulated quantities as desired for planting in check-rows, and also as a check-rower planter for dropping the seed in charges for hills from a seed-cup disk operated by check-rower apparatus to the lower valve or valves, which are also actuated by the check-rower devices to discharge the seed in check-rows.

Another object of my invention is to provide new and improved lifting devices by means of which the front frame may be readily raised from the ground.

Another object of my invention is to provide a new and improved runner-valve by which the seed is suitably discharged after having been delivered to the seed-tube by the seed disks, plates, or valve.

Another object of my invention is to provide new and improved mechanism for operating the seed disks, plates, or valves in the seed boxes or hoppers of the machine.

Another object of my invention is to provide new and improved mechanism by which the gear adapted to drive the seed plates, disks, or valves may be connected or disconnected with the check-rower devices or connected and disconnected with the shaft carrying the driving-wheel, so that said seed plates, disks, or valves may be operated either intermittently by the check-rower devices or continuously from the shaft of the main wheels.

Another object of my invention is to provide new and improved mechanism by which a planter adapted to plant corn may be used for or converted into a planter adapted to plant cotton-seed.

Another object of my invention is to provide a new and improved seed plate, disk, or valve adapted for use in a planter for planting cotton-seed.

I attain these objects as hereinafter specified and as illustrated in the drawings.

That which I regard as new will be set forth in the claims.

In the accompanying drawings.

13 is an enlarged detail, being a view of the form of seedbox shown in Fig. 11 with a cotton-seeding plate or disk therein instead of a corn-seeding valve.

Referring to Figs. 17, 18, and 19, 22 indicates the front or runner frame of the planter, which is provided with seedboxes 23, carried on said front frame, with brackets 24, supporting sheaves 25, and forked levers 26, pivoted on said brackets. The seedboxes, front frame, guiding-sheaves, and forked levers are of the ordinary construction and need not be further described.

Figure 1:
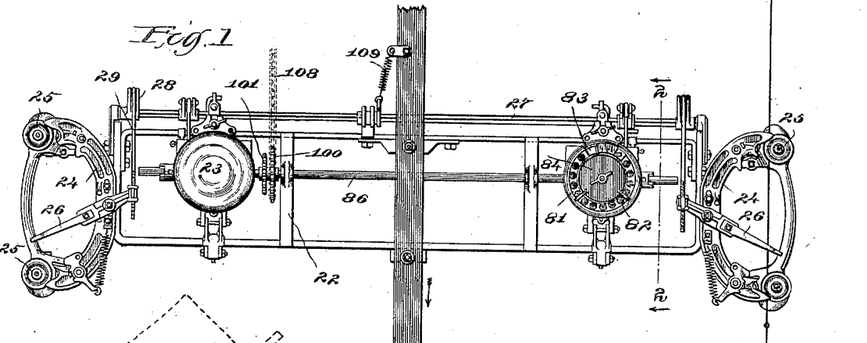
Figure 1 is a top or plan view of the front frame, the runners being omitted.

27 indicates a rock-shaft journaled in the rear of and to the front frame 22 and connected by arms 28 and links 29 with the forked levers 26, which are operated by a knotted wire 30 (see Fig. 1) in the usual manner.

31 indicates the rear or wheel frame, which is pivoted to the front frame at points 32 and is supported by wheels 33, which are keyed or otherwise secured to a shaft or axle 34, which is journaled in the rear frame 31. (See Fig. 17.)

Figure 18:
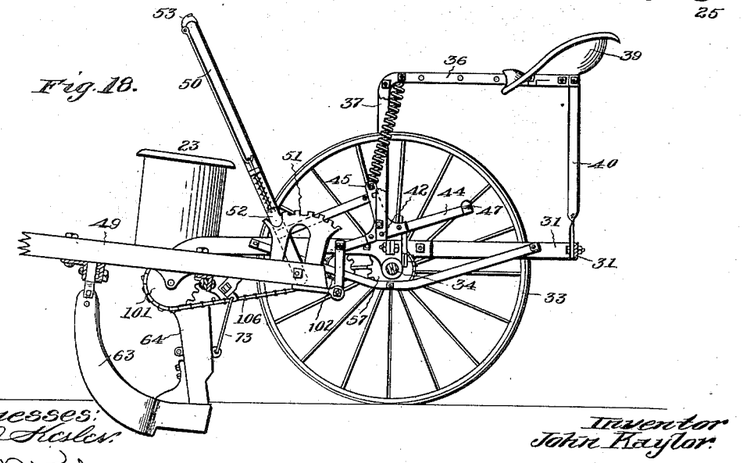
Fig. 18 is a side elevation, partly in vertical longitudinal section, on line 18 18 of Fig. 17.
Figure 19:
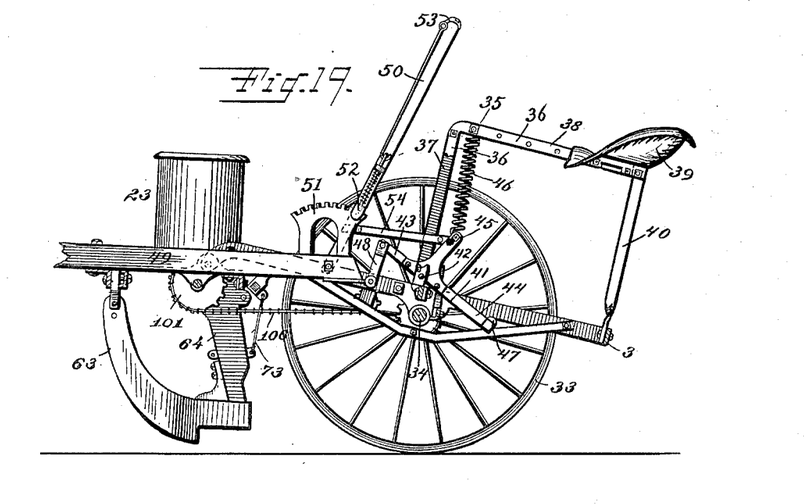
Fig. 19 is the same as Fig. 18, showing the runners raised from the ground.

35 indicates a support which is composed of beams 36, bent at right angles, so as to form upright portions 37 and rearwardly-extending portions 38. The upright portions 37 are secured to the rear frame, as is best shown in Figs. 18 and 19, and the rearwardly-extending portions 38 support the seat 39 and are supported at their rear ends by an upright 40, one end of which is secured to the rear end of the rearwardly-extending portions 38 and the other to the rear frame 31.

41 indicates a three-armed or bell-crank lever which is pivoted to the rear frame above the axle 34 by a pivot 42 and is provided with a forward-extending arm 43, rearward-extending arm 44, and upward-extending arm 45. The upward-extending arm 45 is connected by a retraction-spring 46 with the support 35. The rearward-extending arm 44 is provided with a foot-rest 47, and the forward-extending arm 43 is connected by a link 48 with the rear end of the tongue 49, which is rigidly secured to the front frame 22.

50 indicates a hand-lever which is pivoted at its lower end near the rear end of the tongue 49 and is provided with a segmental rack 51, with the usual spring-dog attachment 52, adapted to engage the segmental rack, and with the usual hand-lever 53, adapted to withdraw the dog 52 from the segmental rack 51 in order to permit the swinging of the lever 50. The lever 50 is connected by a link 54 with the upward-extending arm 45 of the bell-crank lever 41.

The operation of these devices is as follows: The front frame being lowered and the runners in the ground in the position shown in Fig. 18, it will be seen that the spring 46 tends to lift the runners from the ground, or to assist in lifting them from the ground, by its tension operating upon the upwardly-extending arm 45, which has passed forward of the line between the pivotal point 42 of the bell-crank lever 41 and the connection of said spring 46 with the upright 35. Pressure is then exerted upon the foot-rest 47, forcing the rear end of the bell-crank lever downward. As the lever 41 swings upon its pivot the front frame of the machine is raised from the ground, the lifting being assisted by the operation of the spring 46, until the upward-extending arm 45 comes in line with the pivotal point of the bell-crank lever and the attachment of the spring 46, to the support 35. As the rear end of the bell-crank lever is forced farther downward the runners are lifted higher from the ground against the tension of the spring 46 until the parts assume the position shown in Fig. 19. This operation may be assisted by pulling backward upon the hand-lever 50, which being connected with the upward-extending arm 45 by the link 54 will assist in the operation of the bell-crank lever 42. It is obvious, however, that the lifting of the machine may be accomplished either by the foot-pressure upon the bell-crank lever alone or by the use of the hand-lever 50 alone. When it is desired to lower the runners, the spring-dog 52, which locks the hand-lever in position, is disengaged from the segmental rack 51, and the front frame will fall by its own weight, assisted in the first part of its movement by the operation of the spring 46, and may be thrust forward positively into the ground by throwing forward the hand-lever 50. It will be observed that the action of the spring 46 tends to assist the lifting of the runners from the ground during the first portion of the movement and also to assist in the lowering of the runners to the ground during the first portion of the lowering movement.

Figures 20, 21:
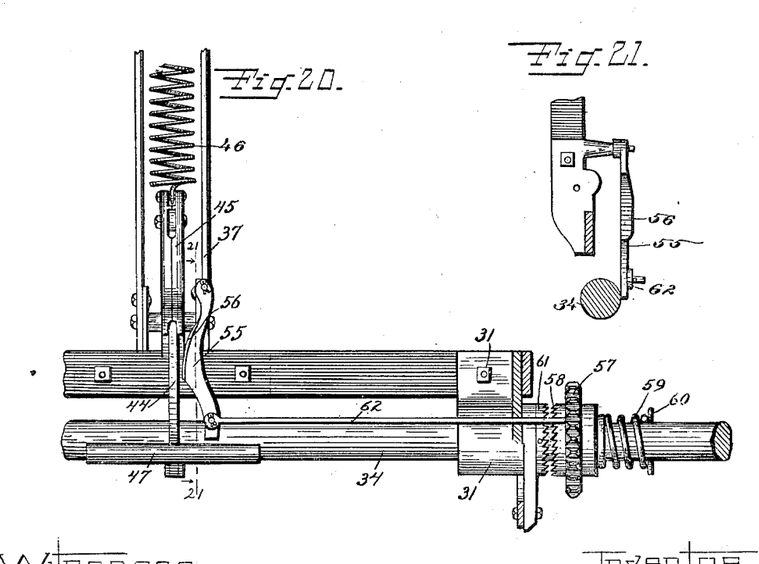
Fig. 20 is an enlarged detail, being a partial vertical cross-section upon line 20 20 of Fig. 17 and showing the mechanism for throwing the devices which operate the seed plates, disks, or valves from the rear shaft into and out of gear.
Fig. 21 is an enlarged detail, being a vertical longitudinal section on line 21 21 of Fig. 20.

Referring particularly to Figs. 20 and 21, 55 indicates a swinging cam which is pivoted to one of the uprights 37 and is provided with a bearing-surface 56, which is adapted to bear against the side of the rearwardly-extending portion 44 of the bell-crank lever 41, so that as said lever is thrown downward the swinging cam 55 is moved over to the right in Fig. 20 by the contacting of the arm 44 with the bearing-surface 56. 57 indicates a sprocket-wheel which is journaled upon the shaft or axle 34 and which is provided upon the inner side of its hub with a clutch member 58. 59 indicates a spring which bears against a split pin 60 on said shaft 34 and against the hub of the sprocket-wheel 57 and operates by its expansion to normally force said sprocket-wheel 57 toward the left in Fig. 20. 61 indicates a clutch member which is pinned or otherwise secured to the shaft 34 and rotates therewith. 62 indicates a rod, one end of which is pivotally connected with the lower end of the swinging cam 55, and it is supported near its other end by passing through a suitable opening in one of the side bars of the rear frame 31, and its free end abuts against the sprocket-wheel 57. The operation of these devices is as follows: When the runners are lowered into the ground and the parts are in the position shown in Fig. 18, the swinging cam 55 is freed from engagement with the arm 44 of the lever 41, and the spring 59 being free to exert its pressure forces the sprocket-wheel 57 to the left, so that the clutch member 58 engages with the clutch member 61, and as the machine is moved forward the axle 34, being rotated by the action of the main wheels 33, rotates with it the sprocket-wheel 57. When, however, the runners are raised from the ground, as shown in Fig. 19, and the rear arm 44 of the bell-crank lever is depressed, it engages with the swinging cam 55 and forces the same to the right in Fig. 20. The rod 62 being moved to the right with it engages the sprocket-wheel 57 and forces it to the right against the action of the spring 59 and disengages the clutch members 58 and 61, so that when the front frame is raised from the ground the clutch is thrown out of operation and the sprocket-wheel 57 is not rotated with the forward motion of the machine.

Figures 2, 3, 4:
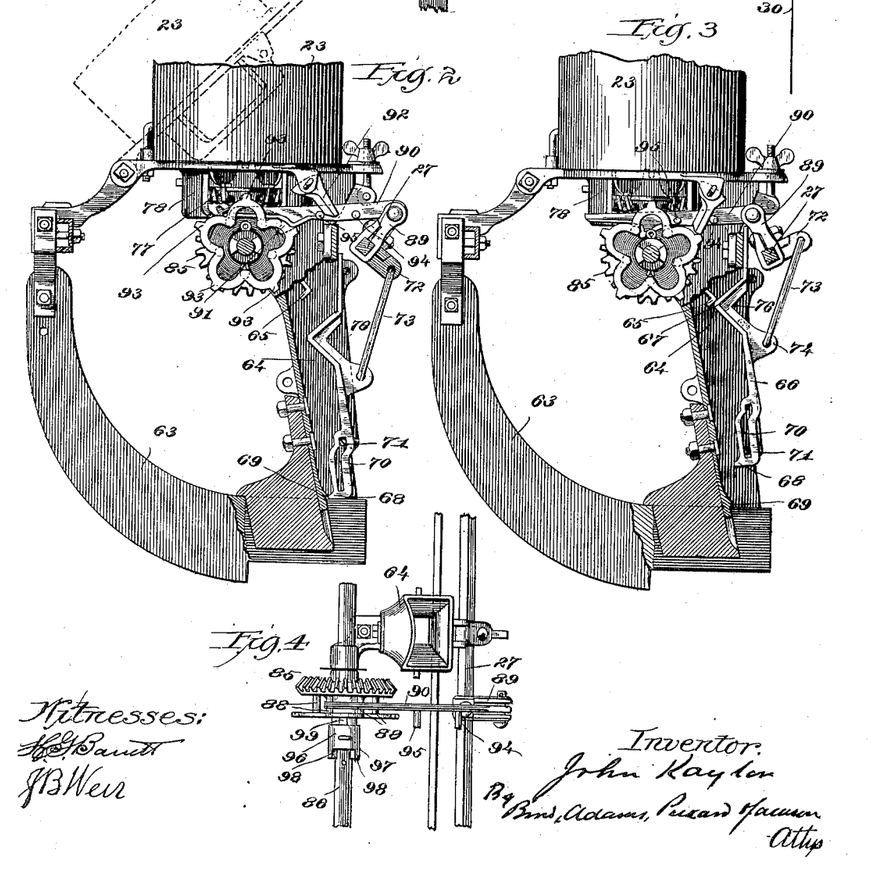
Fig. 2 is an enlarged detail, being a vertical longitudinal section on line 2 2 of Fig. 1 and partially itself in vertical section, showing the runner, the runner or seed valve, and means for operating the same.
Fig. 3 is an enlarged detail, being the same view as Fig. 2, but showing the runner or seed valve raised, so as to open the seed-tube below and close it above.
Fig. 4 is an enlarged detail, being a plan view of a portion of the top of the runner and showing the devices for actuating the runner or seed valve.
Figure 5:
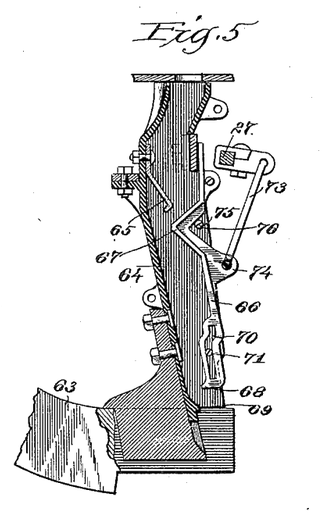
Fig. 5 is an enlarged detail, being a vertical section of the seed-tube with a portion of the runner and showing the runner or seed valve lifted and secured in an intermediate position to allow the machine to be used as a drill.

Referring to Figs. 2, 3, 5, and 7, 63 indicates a furrow-opening runner of the ordinary construction, which is mounted upon the front frame 22 below the seedboxes. 64 indicates a seed-tube which opens above into the seedboxes 23 and below and behind the heel of the runner 63. Near its upper end the seed-tube 64 is provided with a shelf 65, which is adapted, in conjunction with the runner-valve hereinafter described, to form a shelf upon which the corn may be dropped and temporarily retained, as hereinafter described. 66 indicates a runner-valve which is mounted in the back of the seed-tube 64, so as to slide longitudinally of itself and approximately vertically up and down therein. The runner-valve 66 has formed on or is provided near its upward end with a forwardly-extending projection or shelf 67, which is of such size and shape that when the runner-valve 66 is raised in the position shown in Fig. 3 its forward end contacts the shelf or shoulder 65, forming a shelf upon which the corn from the seed-hopper, hereinafter described, may be dropped and temporarily retained. The runner-valve 66 has formed on or is provided at its lower end with a forward-projecting shoulder 68. 69 indicates a rearward-projecting shoulder on the front face of the seed-tube 64 near the bottom thereof. The shoulders 68 and 69 are of such shape and size that when the runner-valve 66 is lowered in the position shown in Fig. 2 the two shoulders contact and form a shelf upon which the corn is dropped and where it is temporarily retained until the runner-valve 66 is raised, allowing the corn held by the shoulders 68 and 69 to drop into the furrow. 70 indicates a slot in the lower end of the runner-valve 66. The slot 70, near its upper end, is curved upward and backward, as is best shown in Figs. 2, 3, and 5. 71 indicates a pin which is mounted in the seed-tube 64 and passes through the slot 70. It will be observed that by means of the operation of the pin 71 in the slot 70, when the runner-valve 66 is raised, the pin 71, passing into the bent portion of the slot 70, will operate to swing the lower end of the runner-valve 66 somewhat backward as the valve rises. As the valve falls the operation is reversed and the lower end of the runner-valve is thrown forward, so that the shoulder 68 contacts the shoulder 69. 72 indicates an arm which is secured to the rock-shaft 27 and is connected by a link 73 with a lug 74 upon the rear of the runner-valve 66. When the rock-shaft 27 is rocked by the operation of the check-rower devices above described, the valve 66 will be alternately raised and lowered. When the valve 66 is in its raised position, (shown in Fig. 3,) the corn is first deposited by the operation of the seed plates or disks, hereinafter described, upon the shelf formed by the shelf 65 and projection 67, where it is temporarily held until the runner-valve 66 is lowered. When the runner-valve 66 is lowered, the angular projection 67 and the shelf 65 are separated and the corn drops and the shoulders 68 and 69 contacting one another the corn is retained upon the shelf so formed, to be dropped into the ground from that point when the runner-valve 66 is again raised.

When it is desired to use the machine in drilling, as hereinafter described, the rock-shaft 27 is partially rotated into the position shown in Fig. 5, which raises the runner-valve 66 to about a midway position, in which position the operation of the pin 71 in the slot 70 throws the runner-valve somewhat backward, as is shown in Fig. 5, and the shelf 65 and shoulder 67 being separated a free passage for the corn from the hopper through the seed-tube into the ground is permitted. The runner-valve 66 is held in this partially-raised position by means of a pin 75, which is secured in the seed-tube 64 and engages with a notch 76 in the runner-valve 66. It will of course be understood that when using the machine thus in drilling with the valve 66 held in this position no check-rower wire is used, and consequently the actuating forked levers 26 are not operated and the rock-shaft remains stationary.

Figures 7, 8, 9, 10:
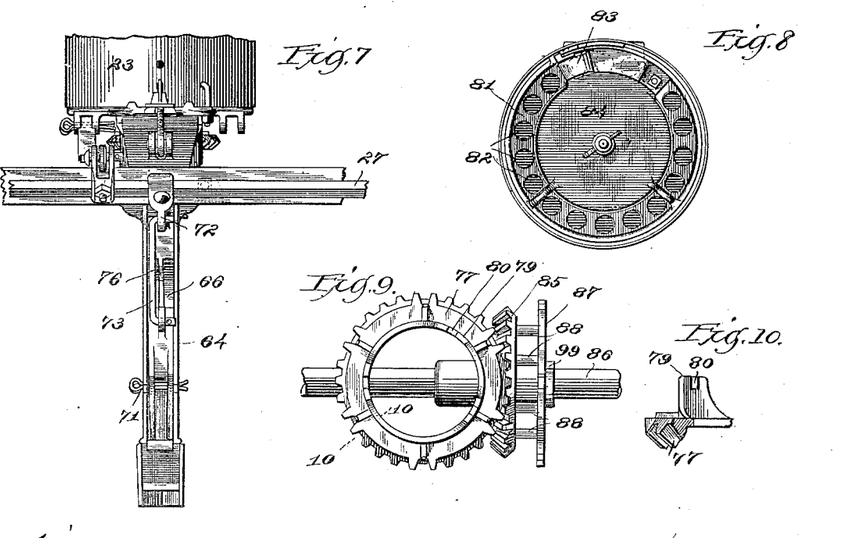
Fig 7 is an enlarged detail, being a rear view of one of the seedboxes and the runner.
Fig. 8 is an enlarged detail, being a view of the bottom of the seedbox with seed valve, plate, or disk, and cover-plates in place, seen from above.
Fig. 9 is an enlarged detail, being a top or plan view of the gear mechanism which rotates the seed plate, disk, or valve.
Fig. 10 is an enlarged detail, being a section of a portion of the beveled gear, taken on line 10 10 of Fig. 9.

77 indicates an annulus-shaped beveled gear which is rotatably mounted in the bottom 78 of the seedbox 23. The general shape and construction of this gear are best shown in Fig. 9. The gear 77 is provided with upward-projecting lugs 79, (see Figs. 9 and 10,) which are provided with slots 80, adapted to receive suitable projections in the under surface of a seed plate or disk 81, (see Fig. 8,) so that the seed-plate may be carried by said gear and rotated therewith. The seed plate or disk 81 is provided with the usual openings 82, which receive the grains of corn and carry them around under a cut-off 83, so that they may pass through the opening in the bottom of the seedbox 23 into the seed-tube 64. The seed disks or plates 81 may be of any approved form and construction, and the number of openings and the size thereof will of course be varied in accordance with the work that is to be done and with the manner in which the machine is used.

84 indicates the usual cover-plate which is mounted in the seedbox above the seed plate or disk 81.

85 indicates a beveled gear, which is loosely mounted upon a shaft 86, so as to rotate independently thereof, and is provided with a star-shaped ratchet-wheel 87, which is rigidly connected therewith by a series of pins 88, which are of the same number as the points of the star-shaped ratchet-wheel 87 and are connected with said wheel at the base of or the angle between said points. I have shown these points and pins as five in number; but the number may of course be varied.

89 indicates an arm secured to the rock-shaft 27.

90 indicates a pawl which is pivoted to the outer end of the arm 89 and has upon its under side at a suitable distance from its forward end a downward-projecting lug 91, which is adapted to engage with the pins 88, the portion of said pawl forward of said lug resting upon and supported by the pins.

92 indicates a detent which is pivoted to the under side of the seedbox 23 and depends downwardly therefrom and is adapted when thrown forward, as hereinafter described, to engage successively with the points 93 of the star-shaped ratchet-wheel 87.

94 95 indicate pins which are carried by the pawl 90 and are adapted to engage the detent 92 and throw it forward into engagement or backward out of engagement with the star-shaped ratchet 87 as the pawl 90 is thrown forward or backward.

Figure 6:
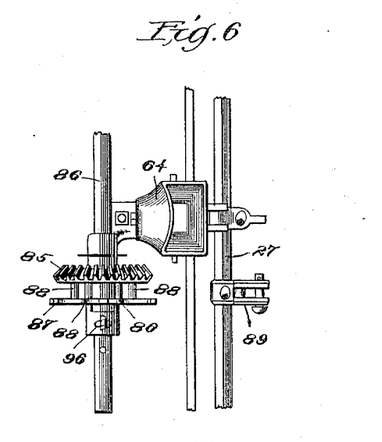
Fig. 6 is an enlarged detail, being a view of the same devices shown in Fig. 4, but showing the gear which drives the runner or seed valve adjusted to be continuously rotated by the rotation of the shaft upon which it is mounted and with the devices for operating the same by check-rower apparatus removed.

Referring to Figs. 4 and 6, 96 indicates a collar which is mounted upon the shaft 86 by means of a pin 97 passing through a suitable opening therein. The collar 96 is provided at one end with prongs 98, and its other end is flush, so as to bear against the hub or boss of the beveled gear 85. When the beveled gear 85 is driven by the check-rower mechanism, as above described, the collar 96 is mounted as is shown in Fig. 4, in which case it simply serves as a bearing for the hub or boss of the beveled gear 85. The hub or boss of the beveled gear 85 is provided with suitable slots 99, (indicated by dotted lines in Fig. 4, see also Fig. 9,) into which the prongs 98 of the collar 96 are adapted to fit, so that when the said collar is placed upon the shaft, with its prongs toward the beveled gear, as shown in Fig. 6, it forms one member of a clutch, the other member of which is formed by the slotted hub of the beveled gear, and the collar being pinned upon the shaft 86, as above described, when the said shaft 86 is rotated, as hereinafter described, the beveled gear is rotated with it. When so used, the pawl 90 is removed and the planter may be used either as a cumulative drop, the hopper-valve being continuously rotated, so as to feed one grain of corn at a time into the runner-valve, which being intermittently operated by the check-rower devices discharges the accumulated grains in check-rows, or the planter may be used as a drill, the hopper-valve being continuously driven, the check-rower mechanism being disconnected, and the runner-valve being raised in the position shown in Fig. 5 to permit the continuous discharge of the grain.

100 101 indicate sprocket-wheels which are keyed or otherwise secured upon the shaft 86. (See Figs. 1 and 17.)

102 103 indicate sprocket-wheels which are mounted upon a stub-axle 104, which is mounted upon the rear frame.

105 indicates a sprocket-chain which connects the sprocket-wheel 57 upon the rear axle 34 with the sprocket-wheel 102, and 106 indicates a sprocket-chain which connects sprocket-wheels 103 and 101. The sprocket-wheels 102 103 are formed integral upon the same hub or boss or otherwise rigidly connected together. When the machine is driven and the clutch mechanisms 58 and 61 are in engagement, as above described, the sprocket-wheel 57 is rotated, and by means of the sprocket-chain 105, sprocket-wheels 103 and 101, and sprocket-chain 106 the shaft 86 is rotated. Instead of connecting the sprocket-wheel 57 as just described a single sprocket-chain 108 (indicated by dotted lines in Fig. 1) may directly connect the sprocket-wheel 57 with the sprocket-wheel 100, according to the character of the work to be done.

It will be obvious that the planter, as above described, may be used in one of three ways. First, it may be used as a drill, in which case the sprocket-wheel 57 on the axle is connected by means of either of the arrangements above described, so as to rotate the shaft 86. The collar 96 being in the position shown in Fig. 6, the beveled gear 85 is rotated with the rotation of the shaft 86, and the beveled gear 77 below the seedbox or hopper is continuously rotated, carrying with it the appropriate seed-plate in the hopper or seedbox, and the check-rower mechanism being disconnected, as above described, and the runner-valve lifted into the position shown in Fig. 5 the seed is dropped continuously, by the rotation of the seed-feed disk or plate, through the tube into the ground. Secondly, the planter may be used as a check-rower drop. In this case the collar 96 is placed in the position shown in Fig. 4, so as not to engage with the hub of the beveled gear 85, leaving the said beveled gear free to rotate, and the sprocket-chains connecting the axle with the shaft 86 may be removed; but this is not necessary, as the rotation of the shaft 86 will not interfere with the operation of the check-rower devices in actuating the seed-dropping mechanism. The check-rower devices being connected as above described, the forked levers 26 are operated by the check-rower wire intermittently, rocking the rock-shaft 27. By means of the pawl 90 acting as above described the beveled gear is intermittently rotated, rotating with it the seed-valve in the seedbox or hopper, which in this case has openings of such a size as to carry in them a suitable number of grains of corn to be placed in a hill. With each movement of the hopper-valve the grains of corn are deposited first upon the shelf formed by the contacting of the shoulder 67 and the shelf 65, the valve 66 being in its raised position (shown in Fig. 3) and being positively raised into that position by the throw of the forked levers 26, operated by the tappets on the check-rower wire. When the check-rower mechanism is released from the tappets and returns in the usual manner, the rock-shaft 27 returns to its former position by means of a spring 109, (see Figs. 1 and 17,) which operates in the usual manner. The valve 66 drops into the position shown in Fig. 2. The corn resting upon the shelf above described is dropped and retained near the lower part of the heel of the runner by the contacting of the shoulders 68 and 69. When the valve 66 is again raised by the throw of the check-rower mechanism, the charge in the heel of the runner is dropped into the ground, a new charge is received upon the shelf above, and so on. Thirdly, the corn-planter may be used as a cumulative drop, in which case the pawl 90 is removed, the collar 96 placed in engagement with the boss of the beveled gear 85, as is shown in Fig. 6, so that the beveled gear 85 is driven by the sprocket chains and wheels from the axle above described. A valve of suitable size and shape, such as is ordinarily used for such purpose, is placed in the hopper, so that as the same is continuously rotated by the rotation of the beveled gears 85 and 77 a single grain of corn at a time will be dropped into the seed-tube and accumulated upon the shelf formed by the contact of the shoulders 68 and 69. When a sufficient number of grains have thus been deposited upon the shelf, the machine being suitably adjusted for this purpose, the valve is raised, as above described, by the check-rower mechanism and the accumulated grains are dropped into the ground.

Figure 11:
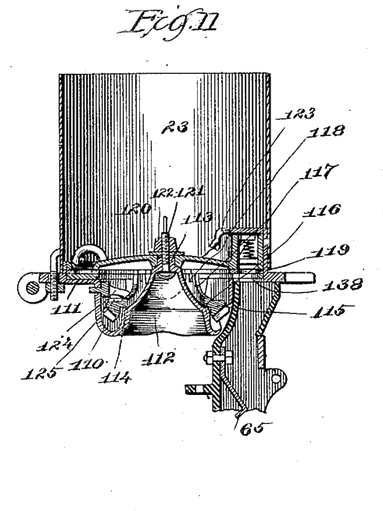
Fig. 11 is an enlarged detail, being a vertical section of the seedbox and a portion of the seed-tube in modified form.
Figure 12:
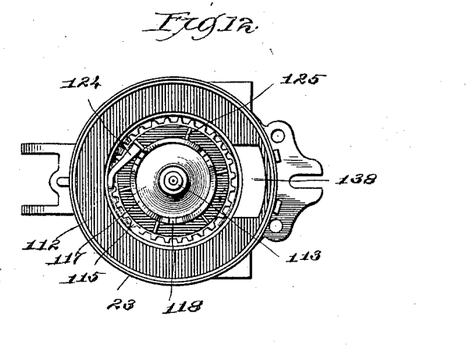
Fig. 12 is an enlarged detail, being a view of the bottom of the seedbox shown in Fig. 11. Fig.
Figure 13:
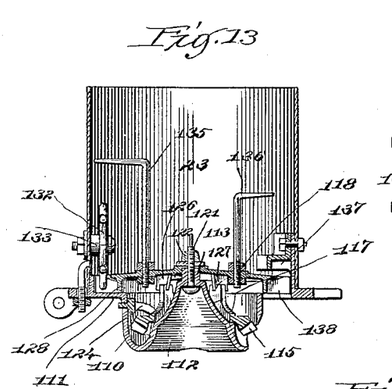
Figure 14:
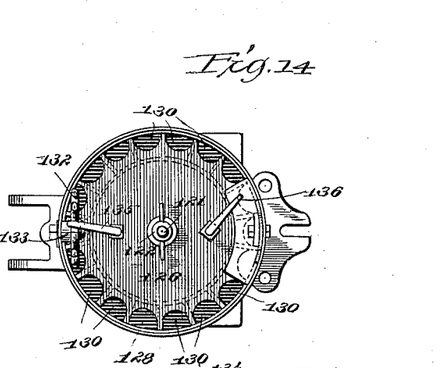
Fig. 14 is an enlarged detail, being a view of the bottom of the seedbox shown in Fig. 13, seen from above.

Figs. 11, 12, 13, and 14 illustrate a modified form of seedbox having a peculiar-shaped bottom and hopper-valve adapted to operate therein, Figs. 13 and 14 showing the same when used for a cotton-seed planter.

Referring then to Figs. 11 and 12, the seedbox 23 is provided with a bowl-shaped downwardly-depending bottom 110, which is smaller in diameter than the diameter of the seedbox 23 and is concentric therewith, so as to form a circumferential shelf 111, adapted to support the valves and plates hereinafter described. The bowl-shaped bottom 110 is provided with a recessed bottom 112, conical in shape, which extends upward into the seedbox 23 and is provided at its top with a cylindrical stud or trunnion 113, adapted to form a central bearing for the plates and valves hereinafter described, and is also provided a short distance above the bowl-shaped bottom 110 with a circumferential shoulder 114, which forms a bearing and support for the beveled gear 115, which is provided with a circumferential shoulder 116, which rests upon the shoulder 114, so that the beveled gear 115 rotates thereon. The beveled gear 115 is formed with upward projections 117, which extend upward into the seedbox and are provided at their tops with notches 118, which engage with the seed plate or valve 119, so that the said plate or valve 119 is rotated by the rotation of the beveled gear 115. The bottom 110 is cut away at its sides, as is shown in Figs. 11 and 13, in order to afford openings through which the beveled gear 115 may engage with the beveled gear 85, by which it is driven in either of the manners above described. 120 indicates a cover-plate, which is secured upon the trunnion 113 by means of a bolt 121 and nut 122, and 123 indicates a cut-off, which may be of any approved form. 124 indicates a pawl which is pivoted in the bowl-shaped bottom 110 and is adapted to engage with radial projections 125 on the gear 115 in such a way that they may slip under the pawl freely when the gear is rotated in the proper direction to feed seed, but may engage with the pawl and prevent backward rotation of said gear.

Figure 15:
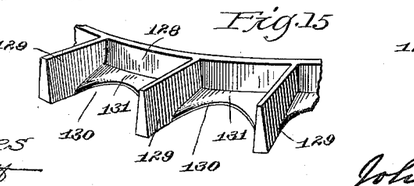
Fig. 15 is an enlarged detail, being an inverted view of a portion of my improved cotton-seeding plate, disk, or valve.
Figure 16:
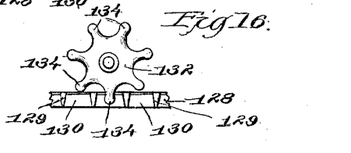
Fig. 16 is a detail, being a view of the rotating device adapted to press the cotton-seed into the seed plate, disk, or valve.
Figure 17:
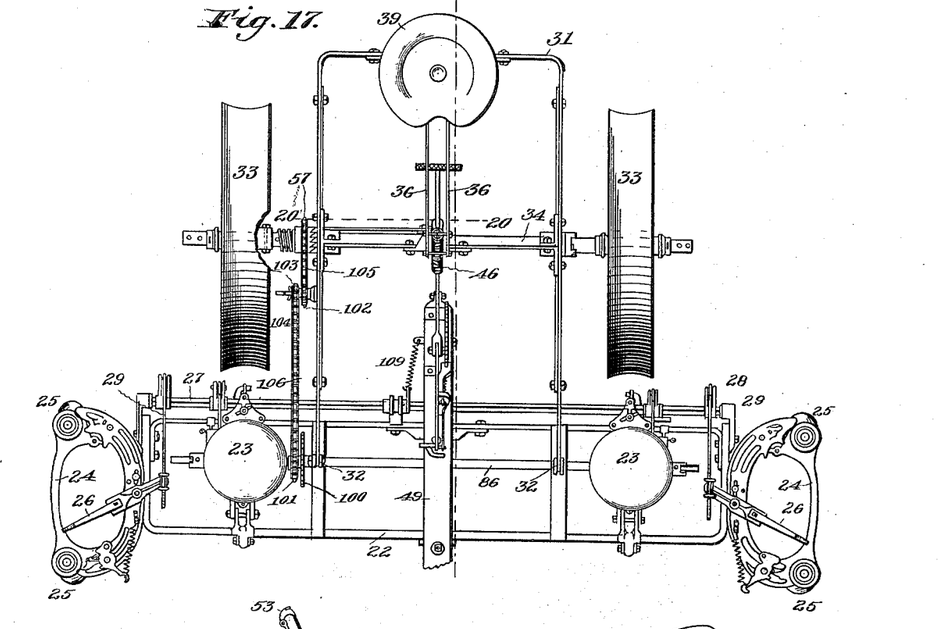
Fig. 17 is a top or plan view of the entire planter.

Figs. 13, 14, 15, and 16 illustrate the seed disk, plate, or valve and other accompanying devices adapted for the sowing of cotton or similar seed, so that the planter may be used as a cotton-seed planter. It is well known that cotton-seed is of a peculiar character, and the seeds are adhesive and apt to stick together when the lint has not been removed, requiring peculiar mechanism to insure the proper planting thereof, and to this end I have invented the devices illustrated in said Figs. 13 to 16, inclusive. 126 indicates a circular plate which is journaled upon the trunnion 113 and is secured thereon by the bolt 121 and nut 122. The plate 126 is provided with downward-depending lugs 127, which are adapted to rest within and be engaged by the notches 118 on the projections 117 of the beveled gear 115. The plate 126 is provided with a circular concentric downward-depending ledge 128, the lower edge of which is adapted to rest upon the circumferential shelf 111. 129 indicates radial arms projecting from the ledge 128 beyond the outer edge of the plate 126 and having their lower edges flush with the lower edge of the circular ledge 128, so that they may rest upon the shelf 111, so as to form a series of chambers or pockets on the under side of said plate 126, adapted to contain charges of cotton-seed. The edge of the plate 126 is cut away between the radial arms 129 into scallops 130, as is best shown in Figs. 14 and 15, which are not so large as the chambers formed by the radial arms forming shelves 131, which form a partial covering for the said pockets or chambers, so that the opening into said chambers or pockets is smaller than the area of the said pockets. The plate 126, thus forming a hopper-valve, is rotated by the beveled gear 115, which engages with the beveled gear 85 and is driven thereby in the manner above described when the same is operated as a drill—that is to say, when it is continuously driven by the sprocket wheels and chains from the rear axle of the machine. 132 indicates a wheel which is journaled upon a pin or stud 133, projecting from the inside of the seedbox 23, and is provided with a number of prongs 134. The prongs 134 are the same distance apart as the distance between the radial ledges 129, and the wheel is so adjusted that the prongs 134 enter into the openings formed by the scallops 130 and are engaged by the radial arms 129 as the plate 126 rotates. The operation of this wheel 132 is to assist in forcing the somewhat sticky and adhesive cotton-seeds into the chambers or pockets formed by the radial arms 129, so as to insure a proper charge of seed being delivered as the plate or hopper-valve 126 rotates. 135 136 indicate stirrers consisting of upright pins bent at their tops at right angles and screwed into or otherwise secured to the plate 136, so that they are carried around by said plate and operate to stir the cotton-seed contained in the hopper or seedbox 23 and assist in the delivery of the same. By means of the arrangement of the plate or seed-valve above described and by reason of its having the openings into the pockets formed by the radial arms 129, somewhat smaller than the pockets, the cotton-seed, forced into the pockets by the operation of the pronged wheel 132, is enabled to separate and loosen up after passing into the chambers or pockets, materially assisting in the delivery of a proper charge of seed. 137 indicates a cut-off which is secured above the plate 126 over an opening 138 in the bottom of the seedbox a short distance above the top of the plate 126, as is best shown in Fig. 13. The space between the bottom of the cut-off 137 and the top of the plate 126 is such as not to permit the cotton-seed to pass under the plate, but at the same time is sufficient to permit the free working of the plate 126, so that the cotton-seed may not be caught and crushed between the cut-off 137 and the plate 126 as the said plate rotates. This form of seed-valve enables cotton-seed to be effectively dropped. The peculiar nature of cotton-seed causes the seed to stick together, and with seed-plates of ordinary construction the cut-off is apt to drag the seed out of the pocket in the plate as the plate revolves under the cut-off, so that either no seed at all or only a part of what should be dropped is deposited. With the seed-plate constructed as above described the seed is forced by the packers into the pockets, and the shelf above the pockets prevents the seed being dragged out of the pockets by the action of the cut-off, insuring the deposit of the proper amount of seed by the planter.

That which I claim as my invention, and desire to secure by Letters Patent, is—

1. In a corn-planter, the combination with a front frame carrying runners and seed devices, and a rear frame hinged to said front frame and provided with wheels, of a standard mounted on said rear frame, a bell-crank lever pivoted on said rear frame and having a forward-projecting arm pivotally connected with said front frame, a rearward-projecting arm provided with a foot-rest and an upward-projecting arm adapted when said lever is rocked to pass forward and backward of said standard, and a spring connecting said upward-projecting arm with said standard, substantially as described.

2. In a corn-planter, the combination with a front frame carrying runners and seed devices, a tongue mounted on said front frame, and a rear frame hinged to said front frame and provided with wheels, of a standard mounted on said rear frame, a bell-crank lever pivoted on said rear frame and having a forward-projecting arm, a rearward-projecting arm provided with a foot-rest, and an upward-projecting arm adapted when said lever is rocked to pass forward and backward of said standard, a link connecting said forward-projecting arm with said tongue, and a spring connecting said upward-projecting arm with said standard, substantially as described.

3. In a corn-planter, the combination with a front frame carrying runners and seed devices, a tongue mounted on said front frame, and a rear frame hinged to said front frame and provided with wheels, of a standard mounted on said rear frame, a bell-crank lever pivoted on said rear frame and having a forward-projecting arm, a rearward-projecting arm provided with a foot-rest, and an upward-projecting arm adapted when said lever is rocked to pass forward and backward of said standard, a link connecting said forward-projecting arm with said tongue, a spring connecting said upward-projecting arm with said standard, a hand-lever mounted on said front frame, and a link connecting said hand-lever and said upward-projecting arm, substantially as described.

4. In a corn-planter, the combination with a front frame having seedboxes, seed-valves in said seedboxes, mechanism for operating said seed-valves, and runners mounted on said frame below said seedboxes and having seed-tubes opening into the same, and having an upper and lower shoulder respectively near the top and bottom of said seed-tubes, of a longitudinally-movable runner-valve mounted in said seed-tube and having upper and lower shoulders adapted to alternately contact with the said upper and lower shoulders respectively in said seed-tube so as to form shelves which will alternately hold and release the seed deposited thereon, check-rower mechanism connected with said runner-valve and adapted to move the same longitudinally, and devices operating upon the lower end of said runner-valve to throw the lower end of said valve slightly backward as the said valve is raised and forward as the same is lowered, substantially as described.

5. In a corn-planter, the combination with a front frame having seedboxes, seed-valves in said seedboxes, mechanism for operating said seed-valves, and runners mounted on said frame below said seedboxes and having seed-tubes opening into the same, and having an upper and lower shoulder respectively near the top and bottom of said seed-tubes, of a longitudinally-movable runner-valve mounted in said seed-tube and having upper and lower shoulders adapted to alternately contact respectively with the said upper and lower shoulders in said seed-tube so as to form shelves which will alternately hold and release the seed deposited thereon, check-rower mechanism connected with said runner-valve and adapted to move the same longitudinally, and a pin mounted in said seed-tube and adapted by contacting the lower end of said runner-valve to move the same slightly backward as said runner-valve is raised and forward as the same is lowered, substantially as described.

6. In a corn-planter, the combination with a front frame having seedboxes, seed-valves in said seedboxes, mechanism for operating said seed-valves, and runners mounted on said frame below said seedboxes and having seed-tubes opening into the same, and having an upper and lower shoulder respectively near the top and bottom of said seed-tubes, of a longitudinally-movable runner-valve mounted in said seed-tube and having upper and lower shoulders adapted to alternately contact respectively with the said upper and lower shoulders in said seed-tube so as to form shelves which will alternately hold and release the seed deposited thereon, check-rower mechanism connected with said runner-valve and adapted to move the same longitudinally, a curved slot in said runner-valve, and a pin mounted in said seed-tube and passing through said slot whereby as said runner-valve is raised the lower end is moved slightly backward and as said runner-valve is lowered the lower end is moved slightly forward, substantially as described.

7. In a corn-planter, the combination with a front frame having seedboxes, seed-valves in said seedboxes, mechanism for operating said seed-valves, and runners mounted on said frame below said seedboxes and having seed-tubes opening into the same, and having an upper and lower shoulder respectively near the top and bottom of said seed-tubes, of a longitudinally-movable runner-valve mounted in said seed-tube and having upper and lower shoulders adapted to alternately contact respectively with the said upper and lower shoulders in said seed-tube so as to form shelves which will alternately hold and release the seed deposited thereon, check-rower mechanism connected with said runner-valve and adapted to move the same longitudinally, and means for holding said runner-valve in a partially-raised position to permit the free passage of seed from the hopper through the seed-tube, substantially as described.

8. In a corn-planter, the combination with a seedbox, a runner, and a seed-tube in said runner opening into said seedbox, of a beveled gear mounted in the bottom of said seedbox, a seed-valve carried by said beveled gear, a shaft below said seedbox, a beveled gear journaled on said shaft below said seedbox adapted to engage with the beveled gear in the bottom of said seedbox, a star-shaped ratchet-wheel connected with the beveled gear on said shaft by a plurality of cross-bars arranged equidistant from each other and from the axis of said beveled gear, a rock-shaft, check-rower mechanism for rocking said rock-shaft, and a pawl carried by said rock-shaft and adapted to successively engage said cross-bars and intermittently rotate said beveled gear, substantially as described.

9. In a corn-planter, the combination with a seedbox, a runner, and a seed-tube in said runner opening into said seedbox, of a beveled gear mounted in the bottom of said seedbox, a seed-valve carried by said beveled gear, a shaft below said seedbox, a beveled gear journaled on said shaft below said seedbox adapted to engage with the beveled gear in the bottom of said seedbox, a star-shaped ratchet-wheel connected with the beveled gear on said shaft by a plurality of cross-bars arranged equidistant from each other and from the axis of said beveled gear, a rock-shaft, check-rower mechanism for rocking said rock-shaft, a pawl carried by said rock-shaft and adapted to successively engage said cross-bars and intermittently rotate said beveled gear, and a detent pivotally suspended below said seedbox operated by said pawl and adapted to successively engage and disengage the points of said star-shaped ratchet-wheel as the same is intermittently rotated, substantially as described.

10. In a corn-planter, the combination with a front frame having runners provided with seed-tubes and seedboxes opening into said seed-tubes, check-rower mechanism carried on said front frame, and a rear frame hinged to said front frame and having an axle journaled on said rear frame, and wheels secured to said axle, of beveled gears mounted in the bottom of said seedboxes, seed-valves carried in said seedboxes by said beveled gears and operated thereby, a shaft journaled in said front frame below said seedboxes, beveled gears journaled on said shaft engaging with said beveled gears in said seedboxes and adapted to be operated by said check-rower mechanism or to be disconnected therefrom, collars mounted on said shaft and adapted to be placed in clutch engagement with the beveled gears mounted on said shaft, and means for rotating said shaft from said axle, substantially as described.

11. In a corn-planter, the combination with a front frame having runners provided with seed-tubes, and seedboxes opening into said seed-tubes, check-rower mechanism carried on said front frame, and a rear frame hinged to said front frame and having an axle journaled on said rear frame, and wheels secured to said axle, of beveled gears mounted in the bottom of said seedboxes, seed-valves carried in said seedboxes by said beveled gears and operated thereby, a shaft journaled in said front frame below said seedboxes, beveled gears journaled on said shaft engaging with said beveled gears in said seedboxes and adapted to be operated by said check-rower mechanism or to be disconnected therefrom, collars mounted on said shaft and adapted to be placed in clutch engagement with the beveled gears mounted on said shaft, a sprocket-wheel mounted on said axle, a sprocket-wheel mounted on said shaft, and a sprocket-chain connecting said sprocket-wheels, substantially as described.

12. In a corn-planter, the combination with a runner having a seed-tube, of a seedbox opening into said seed-tube and having a bowl-shaped bottom of lesser diameter than said seedbox, provided with a concentric upward-extending interior cone-shaped projection having a circumferential shoulder, an annulus-shaped beveled gear adapted to surround said cone-shaped projection and rest upon said circumferential shoulder, and having upward-extending ears provided with notches, an annular seed-valve adapted to rest in said seedbox and to engage with said notches and be carried and rotated by said beveled gear, and mechanism for rotating said beveled gear, substantially as described.

13. In a planter, a seed-valve consisting of a circular plate provided with a series of pockets open from below and with shelves partially covering said pockets from above, substantially as described.

14. In a planter, a seed-valve consisting of a circular plate provided with a series of pockets open from the circumference of said plate and from below, and with shelves partially covering said pockets from above, substantially as described.

15. In a planter, a seed-valve consisting of a circular plate provided on its under side with a series of circumferential seed pockets or chambers separated by radial arms and with openings into said seed-pockets from above of a lesser area than that of said pockets, substantially as described.

16. In a planter, a seed-valve consisting of a circular plate provided on its under side with a series of circumferential seed-pockets open from the circumference and from below, and partially covered over above, substantially as described.

17. In a planter, a seed-valve consisting of a circular plate provided on its under side with a concentric circular downward-projecting ledge, radial arms extending outwardly from said ledge and having their lower edges flush with the lower edge of said ledge and forming a series of circumferential seed-pockets, and shelves, partially covering said pockets from above, substantially as described.

18. In a planter, the combination with a runner having a seed-tube, and a seedbox mounted above said runner and opening thereinto, of a circular seed-valve mounted in said seedbox and having a series of circumferential seed-pockets separated by radial arms, and shelves, partially covering said seed-pockets from above, mechanism for rotating said valve, and a cut-off located above said seed-valve above the opening from said seedbox into said seed-tube, substantially as described.

19. In a planter, the combination with a runner having a seed-tube, and a seedbox mounted above said runner and opening thereinto, of a circular seed-valve mounted in said seedbox and having a series of circumferential seed-pockets separated by radial arms, and partially covered from above by shelves having openings therein, mechanism for rotating said valve, and a packing device adapted to automatically force seed into said openings, substantially as described.

20. In a planter, the combination with a runner having a seed-tube, and a seedbox mounted above said runner and opening thereinto, of a circular seed-valve mounted in said seedbox and having a series of circumferential seed-pockets separated by radial arms, and shelves having openings into said seed-pockets from above of a lesser area than said pockets, mechanism for rotating said valve, and a packer consisting of a wheel journaled in said seedbox and having a plurality of radial projections adapted to engage with the openings in said seed-valve and be rotated thereby, substantially as described.

21. In a planter, the combination with a runner having a seed-tube, and a seedbox mounted above said runner and opening thereinto, of a circular seed-valve mounted in said seedbox and having a series of circumferential seed-pockets separated by radial arms, and shelves having openings into said seed-pockets from above of a lesser area than said pockets, mechanism for rotating said valve, and stirrers carried by said seed-valve, substantially as described.

JOHN KAYLOR.

Witnesses:
C. E. PICKARD,
JULIA M. BRISTOL.